US007976371B2

(12) United States Patent
Izumi et al.

(10) Patent No.: US 7,976,371 B2
(45) Date of Patent: Jul. 12, 2011

(54) GAME DEVICE, GAME DEVICE CONTROL METHOD, AND INFORMATION STORAGE MEDIUM

(75) Inventors: Tadakatsu Izumi, Minato-ku (JP); Satoshi Suzuki, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 778 days.

(21) Appl. No.: 11/997,611

(22) PCT Filed: Jul. 24, 2006

(86) PCT No.: PCT/JP2006/314565
§ 371 (c)(1),
(2), (4) Date: Feb. 1, 2008

(87) PCT Pub. No.: WO2007/015383
PCT Pub. Date: Feb. 8, 2007

(65) Prior Publication Data
US 2010/0160011 A1 Jun. 24, 2010

(30) Foreign Application Priority Data
Aug. 1, 2005 (JP) ................................. 2005-223461

(51) Int. Cl.
A63F 13/10 (2006.01)
A63F 13/00 (2006.01)
G06T 17/40 (2006.01)
(52) U.S. Cl. ........................ 463/1; 463/2; 463/3; 463/4
(58) Field of Classification Search .................. 463/1, 2, 463/3, 4
See application file for complete search history.

(56) References Cited

U.S. PATENT DOCUMENTS

| 4,905,147 | A  | * | 2/1990  | Logg ............................. 463/31 |
| 6,149,520 | A  | * | 11/2000 | Takatsuka ........................ 463/4  |
| 6,210,273 | B1 | * | 4/2001  | Matsuno ............................ 463/8 |
| 6,254,394 | B1 | * | 7/2001  | Draper et al. .................... 434/11 |
| 6,491,582 | B1 |   | 12/2002 | Toyohara et al. |
| 6,585,600 | B1 |   | 7/2003  | Nakagawa et al. |
| 6,935,954 | B2 | * | 8/2005  | Sterchi et al. ................... 463/31 |
| 6,949,024 | B2 | * | 9/2005  | Kaku et al. ...................... 463/31 |
| 2001/0031655 | A1 | * | 10/2001 | Tanibuchi et al. ................ 463/3 |
| 2003/0057884 | A1 | * | 3/2003 | Dowling et al. ............... 315/291 |
| 2006/0183521 | A1 | * | 8/2006 | Hamamoto ....................... 463/8 |
| 2007/0032282 | A1 | * | 2/2007 | Hamamoto ....................... 463/9 |

FOREIGN PATENT DOCUMENTS

| JP | 3145064 B2    | 5/1998  |
| JP | 2000-107454 A | 4/2000  |
| JP | 3053391 B1    | 6/2000  |
| JP | 2000-317137 A | 11/2000 |
| JP | 2002-177643 A | 6/2002  |
| JP | 2002-224442 A | 8/2002  |
| JP | 3581668 B2    | 9/2002  |
| JP | 2003-299876 A | 10/2003 |

* cited by examiner

Primary Examiner — Dmitry Suhol
Assistant Examiner — Jason Skaarup
(74) Attorney, Agent, or Firm — Sughrue Mion, PLLC

(57) ABSTRACT

To provide a game device for producing, in a preferred mode with relatively simple processing, a picture in which a predetermined game event occurs as a result of involvement in multiple contacts. A contact determination unit (74) determines whether or not a predetermined contact condition is satisfied, based on the positions of the contact evaluation target object and the contacting candidate object. A contact evaluation point calculating unit (76) calculates, when it is determined that the predetermined contact condition is satisfied, a contact evaluation point of the contact evaluation target object, based on a state of at least one of the contact evaluation target object and the contacting candidate object in the virtual three dimensional space. A contact evaluation point cumulative value storage unit (78) stores the cumulative value of the contact evaluation point. A game event generation unit (injury event control unit (80)) generates a predetermined game event in association with the contact evaluation target object with a probability based on the cumulative value of the contact evaluation point of the contact evaluation target object.

4 Claims, 11 Drawing Sheets

FIG.2
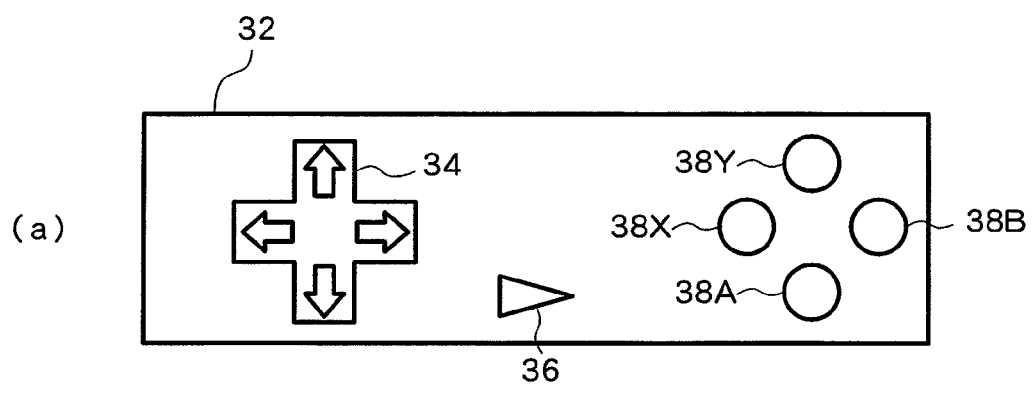
(a)
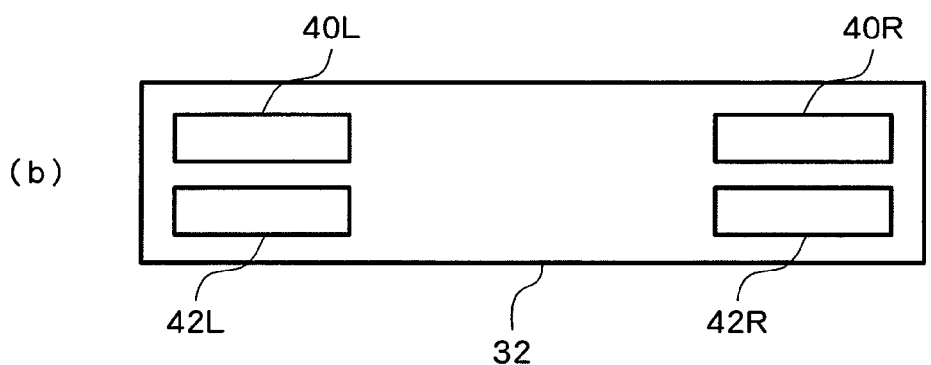
(b)

| PLAYER ID | POSITION INFORMATION | POSTURE INFORMATION | MOVING SPEED INFORMATION | ABILITY PARAMETER |
|---|---|---|---|---|
| P1 | ... | ... | ... | ... |
| P2 | ... | ... | ... | ... |
| P3 | ... | ... | ... | ... |

| θ | CONTACT EVALUATION POINT |
|---|---|
| $0 \leq \theta < \theta_1$ | E 1 |
| $\theta_1 \leq \theta < \theta_2$ | E 2 |
| $\theta_2 \leq \theta \leq \theta_3$ | E 3 |

| Δv | CONTACT EVALUATION POINT |
|---|---|
| $0 \leq \Delta v < V_1$ | E 4 |
| $V_1 \leq \Delta v < V_2$ | E 5 |
| $V_2 \leq \Delta v$ | E 6 |

| PLAYER ID | CONTACT EVALUATION POINT CUMULATIVE VALUE |
|---|---|
| P 1 | ・・・ |
| P 2 | ・・・ |
| P 3 | ・・・ |

| PLAYER ID | REAL INJURY LEVEL | UNAWARE LEVEL | ELAPSE TIME COUNTER |
|---|---|---|---|
| P 1 | 3 | 0 | 1 0 0 |
| P 2 | 3 | 1 | 6 0 |
| P 3 | 3 | 2 | 4 5 |
| P 4 | 2 | 0 | 5 5 |
| P 5 | 2 | 1 | 3 0 |
| P 6 | 1 | 0 | 0 |
| P 7 | 1 | 0 | 0 |

| POSITION | SQUAD NUMBER | PLAYER NAME | INJURY STATE | PERFORMANCE INFORMATION |
|---|---|---|---|---|
| GK | 1 | ... | ●~98a | ... |
| CB | 2 | ... | ○~98b | ... |
| CB | 3 | ... | | ... |
| CB | 4 | ... | ○~98b | ... |
| DMF | 5 | ... | | ... |
| DMF | 6 | ... | | ... |
| SMF | 7 | ... | | ... |

TEAM NAME ...

97

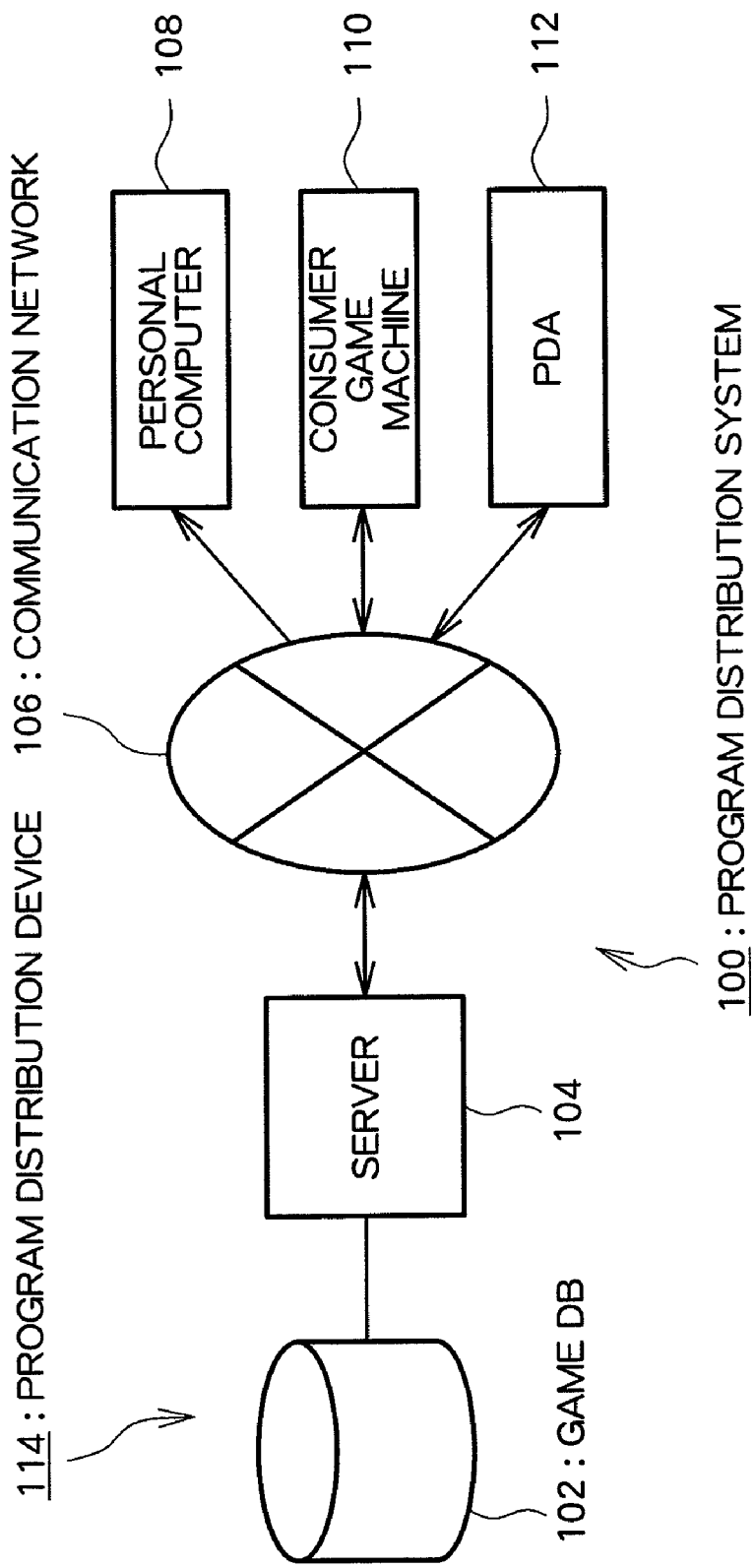

GAME DEVICE, GAME DEVICE CONTROL METHOD, AND INFORMATION STORAGE MEDIUM

TECHNICAL FIELD

The present invention relates to a game device, a game device control method, and an information storage medium.

BACKGROUND ART

A commonly known game device in which a plurality of objects are placed in a virtual three dimensional space, for carrying out a game process for every predetermined period of time to display an image of a picture obtained by viewing the virtual three dimensional space from a predetermined viewpoint is available. In such a game device, generally, a predetermined game event is caused to occur when an object is brought into contact with other object. In a game device for providing a sport game such as soccer or the like, for example, when a player is brought into contact with other player (a contact play), an injury event in which the player is injured is caused to occur with a predetermined probability.
[Patent Document 1] Japanese Patent No. 3145064

DISCLOSURE OF THE INVENTION

Problems to be Solved by the Invention

However, the above-described game device has a problem that a picture of a predetermined game event occurring in response to an object brought into contact with other object cannot be produced in a preferred mode. In the above-mentioned sport game, it is preferable, for example, to produce a picture of a player being injured as a result of not only one-time contact but also multiple contacts with other players.

The present invention has been conceived in view of the above, and aims to provide a game device, a game device control method, and an information storage medium for producing, in a preferred mode with relatively simple processing, a picture a predetermined game event causes to occur as a result of multiple contacts.

Means for Solving the Problems

In order to address the above-described problem, according to one aspect of the present invention, there is provided a game device for carrying out game processing for every predetermined period of time to thereby update positions of a contact evaluation target object and a contacting candidate object placed in a virtual dimensional space and to display an image obtained by viewing the virtual three dimensional space from a predetermined viewpoint, comprising contact determination means for determining whether or not a predetermined contact condition is satisfied, based on the positions of the contact evaluation target object and the contacting candidate object; contact evaluation point calculation means for calculating, when the contact determination means determines that the predetermined contact condition is satisfied, a contact evaluation point of the contact evaluation target object based on a state of at least one of the contact evaluation target object and the contacting candidate object in the virtual three dimensional space; and contact evaluation point cumulative value storage means for storing a cumulative value of the contact evaluation point calculated by the contact evaluation point calculation means so as to be associated with the contact evaluation target object; and game event generation means for generating a predetermined game event in association with the contact evaluation target object with a probability based on the cumulative value of the contact evaluation point stored in the contact evaluation point cumulative value storage means so as to be associated with the contact evaluation target object.

According to another aspect of the present invention, there is provided a control method for a game device for carrying out game processing for every predetermined period of time to thereby update positions of a contact evaluation target object and a contacting candidate object placed in a virtual dimensional space and to display an image obtained by viewing the virtual three dimensional space from a predetermined viewpoint, comprising a contact determination step of determining whether or not a predetermined contact condition is satisfied, based on the positions of the contact evaluation target object and the contacting candidate object; a contact evaluation point calculation step of calculating, when it is determined at the contact determination step that the predetermined contact condition is satisfied, a contact evaluation point of the contact evaluation target object based on a state of at least one of the contact evaluation target object and the contacting candidate object in the virtual three dimensional space; and a step of storing the cumulative value of the contact evaluation point calculated at the contact evaluation point calculation step in a contact evaluation point cumulative value storage means, so as to be associated with the contact evaluation target object; and a game event generation step of generating a predetermined game event in association with the contact evaluation target object with a probability based on the cumulative value of the contact evaluation point stored in the contact evaluation point cumulative value storage means so as to be associated with the contact evaluation target object.

According to another aspect of the present invention, there is provided a program for causing a computer, such as a home-use game device, a commercial game device, a portable game device, a portable phone, a personal computer, a server computer, or the like, to perform as a game device for carrying out game processing for every predetermined period of time to thereby update positions of a contact evaluation target object and a contacting candidate object placed in a virtual dimensional space and to display an image obtained by viewing the virtual three dimensional space from a predetermined viewpoint, comprising contact determination means for determining whether or not a predetermined contact condition is satisfied, based on the positions of the contact evaluation target object and the contacting candidate object; contact evaluation point calculation means for calculating, when the contact determination means determines that the predetermined contact condition is satisfied, a contact evaluation point of the contact evaluation target object based on a state of at least one of the contact evaluation target object and the contacting candidate object in the virtual three dimensional space; and contact evaluation point cumulative value storage means for storing a cumulative value of the contact evaluation point calculated by the contact evaluation point calculation means so as to be associated with the contact evaluation target object; and game event generation means for generating a predetermined game event in association with the contact evaluation target object with a probability based on the cumulative value of the contact evaluation point stored in the contact evaluation point cumulative value storage means so as to be associated with the contact evaluation target object.

The information storage medium according to the present invention is a computer readable information storage medium storing the above-described program. The program distribution device according to the present invention is a program distribution device having an information storage medium storing the above-described program, for reading the program from the information storage medium and distributing the program. The program distribution method according to the present invention is a program distribution method, using the information storage medium storing the above-described program, for reading the program from the information storage medium and distributing the program.

The present invention is related to a game device for displaying an image obtained by viewing from a predetermined viewpoint a virtual three dimensional space where a contact evaluation target object and a contacting candidate object, of which positions are updated in game processing carried out for every predetermined period of time. According to the present invention, it is determined whether or not a predetermined contact condition is satisfied, based on the positions of the contact evaluation target object and the contacting candidate object. When it is determined that the contact condition is satisfied, the contact evaluation point of the contact evaluation target object is calculated based on the state of at least one of the contact evaluation target object and the contacting candidate object in the virtual three dimensional space. Also, the calculated cumulative value of the contact evaluation point is stored in association with the contact evaluation target object. Then, a predetermined game event in association with the contact evaluation target object is caused to occur with a probability based on the cumulative value of the contact evaluation point stored in association with the contact evaluation target object. According to the present invention, a picture of a predetermined game event occurring as a result of involvement in multiple contacts can be produced in a preferred mode with relatively simple processing.

In one embodiment of the present invention, the contact evaluation point calculation means may calculate the contact evaluation point based on the angle formed between the forward direction of the contact evaluation target object and the direction extending from the position of the contact evaluation target object to the position of the contacting candidate object.

In another embodiment of the present invention, the contact evaluation point calculation means may calculate the contact evaluation point based on the information about the difference between the moving speed of the contact evaluation target object and the moving speed of the contacting candidate object.

BRIEF DESCRIPTION OF THE DRAWINGS

FIG. 2 is a diagram showing one example of a controller;

FIG. 17 is a diagram showing a whole structure of a program distribution system according to another embodiment of the present invention.

BEST MODE FOR CARRYING OUT THE INVENTION

In the following, one example of an embodiment of the present invention will be described in detail with reference to the accompanying drawings.

Figure 1:
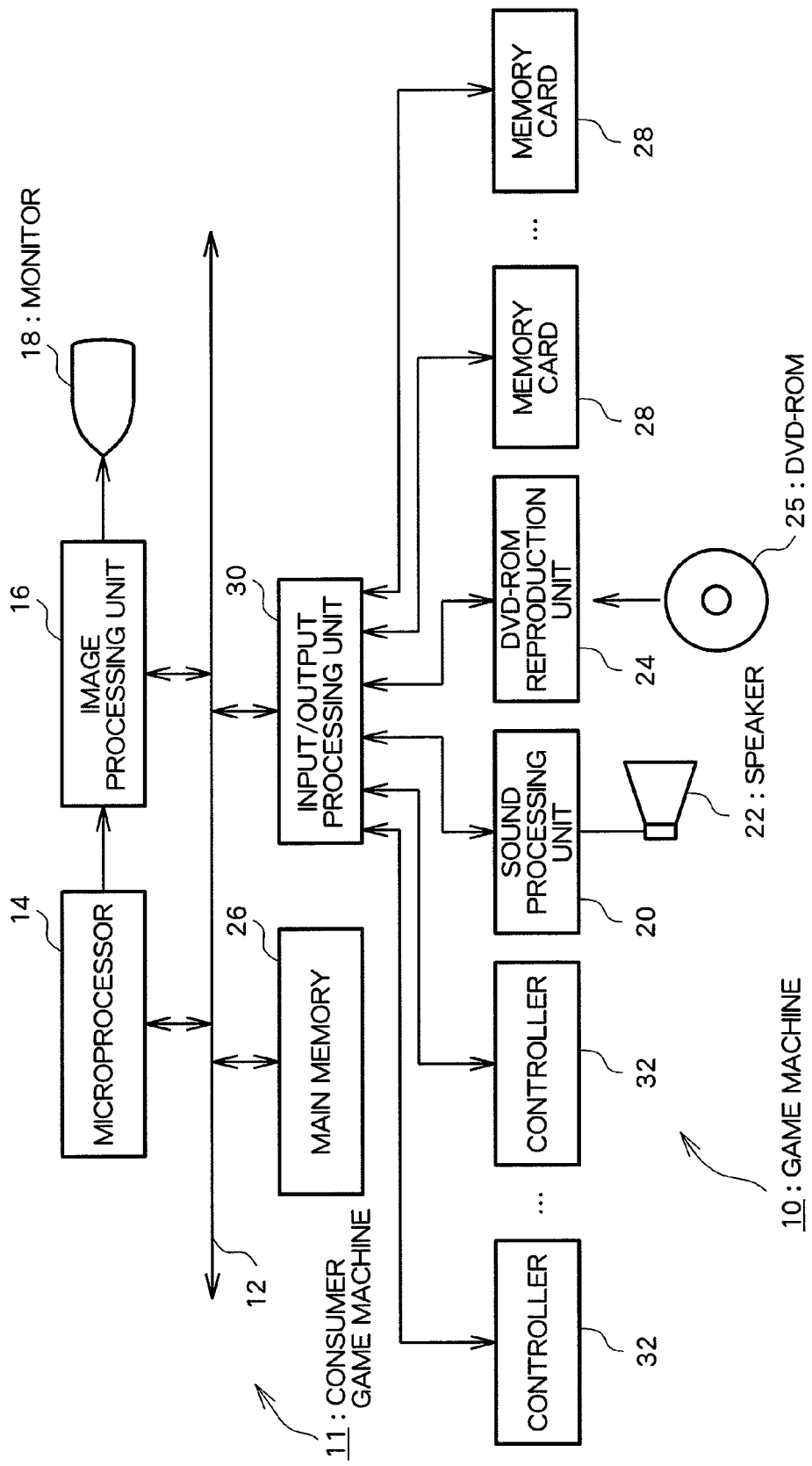
FIG. 1 is a diagram showing a hardware structure of a game device according to an embodiment.

FIG. 1 is a diagram showing a hardware structure of a game device according to an embodiment of the present invention. The shown game device 10 comprises a consumer game device 11 having a DVD-ROM 25 and a memory card 28, or information storage media, mounted thereto, and a monitor 18 and a speaker 22 connected thereto. For example, the monitor 18 may be a home-use television set receiver; the speaker 22 may be a built-in speaker thereof.

The consumer game device 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game device 11. The microprocessor 14, the image processing unit 16, the main memory 26, and the input/output processing unit 30 are mutually connected via the bus 12 for data exchange.

The microprocessor 14 controls the respective units of the consumer game device 11, based on an operation system stored in a ROM (not shown), a program read from the DVD-ROM 25, and data read from the memory card 28. The main memory 26 comprises a RAM, for example, into which a program read from the DVD-ROM 25 and/or data read from the memory card 28 is written as required. The main memory 26 is used also as a working memory of the microprocessor 14.

The image processing unit 16, which comprises a VRAM, renders a game screen image into the VRAM, based on the image data received from the microprocessor 14, then converts the content of the rendered game screen image into a video signal, and outputs the video signal to the monitor 18 at a predetermined timing.

The input/output processing unit 30 is an interface via which the microprocessor 14 accesses the sound processing unit 20, the DVD-ROM reproduction unit 24, the memory card 28, and the controller 32. The sound processing unit 20, the DVD-ROM reproduction unit 24, the memory card 28, and the controller 32 are connected to the input/output processing unit 30.

The sound processing unit 20 comprises a sound buffer, reproduces various sound data, such as game music, game sound effect, a message, and so forth, which is read from the DVD-ROM 25 and stored in the sound buffer, and outputs via the speaker 22.

The DVD-ROM reproduction unit 24 reads a program from the DVD-ROM 25 according to an instruction sent from the microprocessor 14. It should be noted that although the DVD-ROM 25 is used here to provide a program to the consumer game device 11, any other information storage medium, such as a CD-ROM, a ROM card, or the like, may be used. Alternatively, a program may be provided via a data communication network, such as the Internet, or the like, from a remote place to the consumer game device 11.

The memory card 28 comprises a nonvolatile memory (for example, EEPROM, or the like). The consumer game device 11 has a plurality of memory card slots defined therein, each for accepting a memory card 28, so that a plurality of memory cards 28 can be inserted into the consumer game device 11 at the same time. The memory card 28 can be removed from the slot and stores various game data, such as saved data, or the like.

The controller 32 is a general purpose operation input means, via which the game player inputs various game operations. The input/output processing unit 30 scans the states of the respective units of the controller 32 in a constant cycle (for example, every 1/60 second) and sends an operation signal about the scanning result to the microprocessor 14 via the bus 12. The microprocessor 14 determines the game operation carried out by the game player, based on an operation signal. The consumer game device 11 is adapted to connection to a plurality of controllers 32. The microprocessor 14 controls a game, based on the operation signals input from the respective controllers 32.

FIG. 2 shows one example of the controller 32. The shown controller 32 is a general-purpose game controller. The controller 32 has, as shown in FIG. 2 (*a*), a direction button 34, a start button 36, buttons 38X, 38Y, 38A, 38B, all provided on the front surface thereof, and as shown in FIG. 2(*b*), the buttons 42L, 42R, provided on the left and right sides, respectively, of the lateral surface thereof closer to the front surface, and the buttons 40L, 40R similarly provided but closer to the rear surface. The direction button 34 is a cross shaped button generally used to designate a direction in which to move the character and/or cursor. The start button 36 is a small triangle press button generally used to start and/or forcibly end the game. The buttons 38X, 38Y, 38A, 38B, 40L, 40R, 42L, 42R are used for other game operations.

In a game device 10 having the above-described hardware structure, a computer program for a soccer game is read from the DVD-ROM 25, and a plurality of player objects (each object representative of a soccer player) play a soccer game on a real time basis in the virtual three-dimensional space created in the main memory 26.

Figure 3:
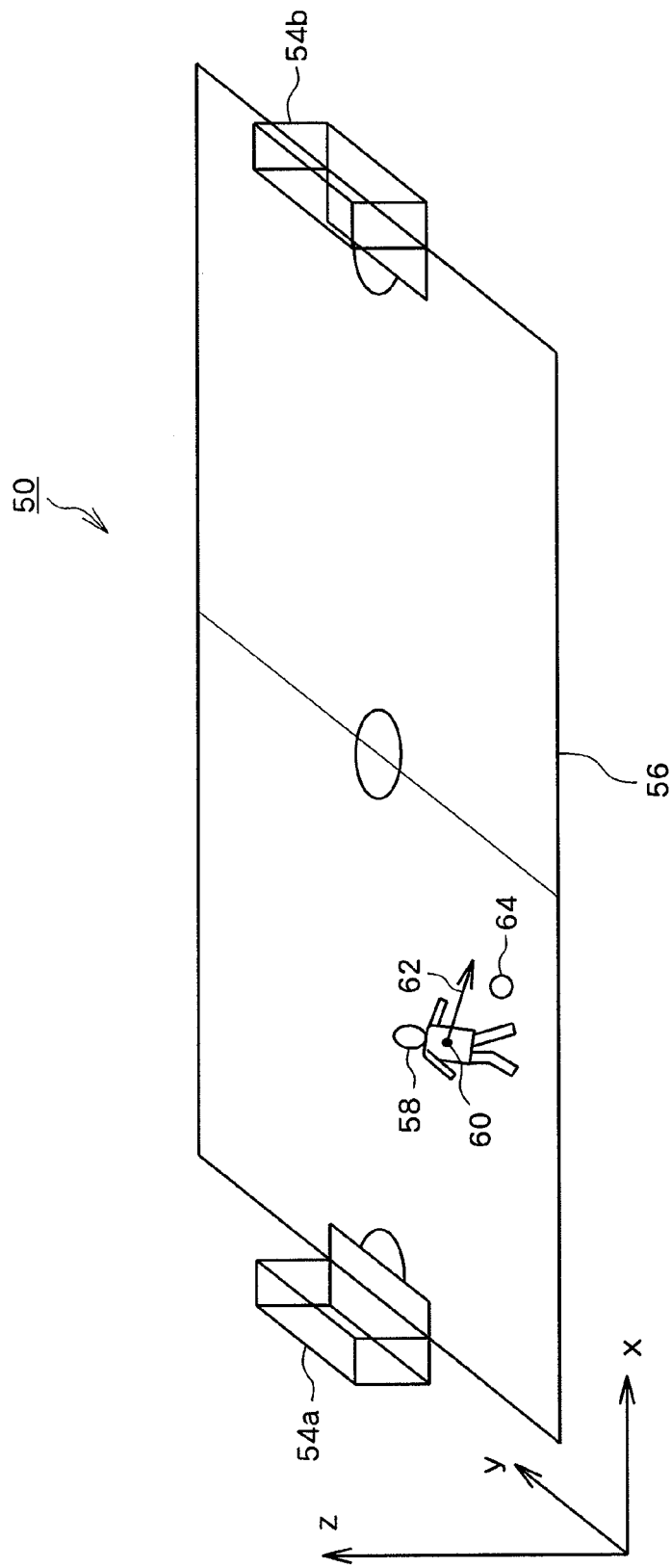
FIG. 3 is a perspective view showing one example of a virtual three dimensional space.

In this embodiment, a virtual three dimensional space 50 where a field object 56 and goal object 54*a*, 54*b*, together representing a soccer pitch, are placed is created in the main memory 26, as shown in FIG. 3, and an image obtained by viewing the virtual three dimensional space 50 from a viewpoint set therein in a predetermined sight line direction is displayed on the monitor 18.

A player object 58 and a ball object 64 representative of a soccer ball are placed in the field object 56. Actually, a plurality of player objects are placed in the field object 56, though not all are shown. These player objects are associated with a player team, or a team to be played by the game player, or an opponent team, or a opponent of the player team.

The player object 58 to be operated by the game player moves in many ways in response to an operation carried out using the controller 32. Specifically, the player object 58 to be operated by the game player changes the position and posture thereof in the virtual three dimensional space 50 according to an operation signal input from the controller 32. Moreover, player objects 58 other than the player object 58 to be operated by the game player change the position and posture thereof in the virtual three dimensional space 50 according to a predetermined algorithm, thereby playing soccer. The goal objects 54*a*, 54*b* are each associated with either the player team or the opponent team, similar to the player objects.

As the player object 58 approaches the ball object 64, the player object 58 is associated with the ball object 64 under a predetermined condition, with the ball object 64 thereafter moving following that player object 58. This is represented by the player object 58 dribbling the ball object 64, shown on the monitor 18. Once the player object 58 to be operated by the game player is associated with the ball object 64, the player object 58 to be operated by the game player can be controlled by operating the controller 32 such that the player object 58 to be operated by the game player kicks the ball object 64. That is, it is possible to control the player object 58 so as to pass or shoot the ball.

The player object 58 charges to perform a slide-tackle or the like on the other player object associated with the ball object 64 according to a predetermined algorithm or an operation carried out using the controller 32. When the player object 58 successively takes the ball object 64, the ball object 64 is then made associated with that player object 58.

With the ball object 64 put into the goal object 54*a* or 54*b* associated with one of the teams after an attempt to seize the ball object 64, as described above, the other team makes a score.

In the game device 10 according to the embodiment, when the player object 58 contacts other player object 58 (contact play), the player object 58 involved in the contact play may be injured. Regarding this point, the game device 10 can show, in a preferred mode with relatively simple processing, a picture in which the player object 58 is injured after involvement in multiple contact plays. The game device 10 also can show, in a preferred mode with relatively simple processing, a picture in which the injured player object 58 keeps playing, not aware of the injury itself or the seriousness thereof until they become aware of it later.

Figure 4:
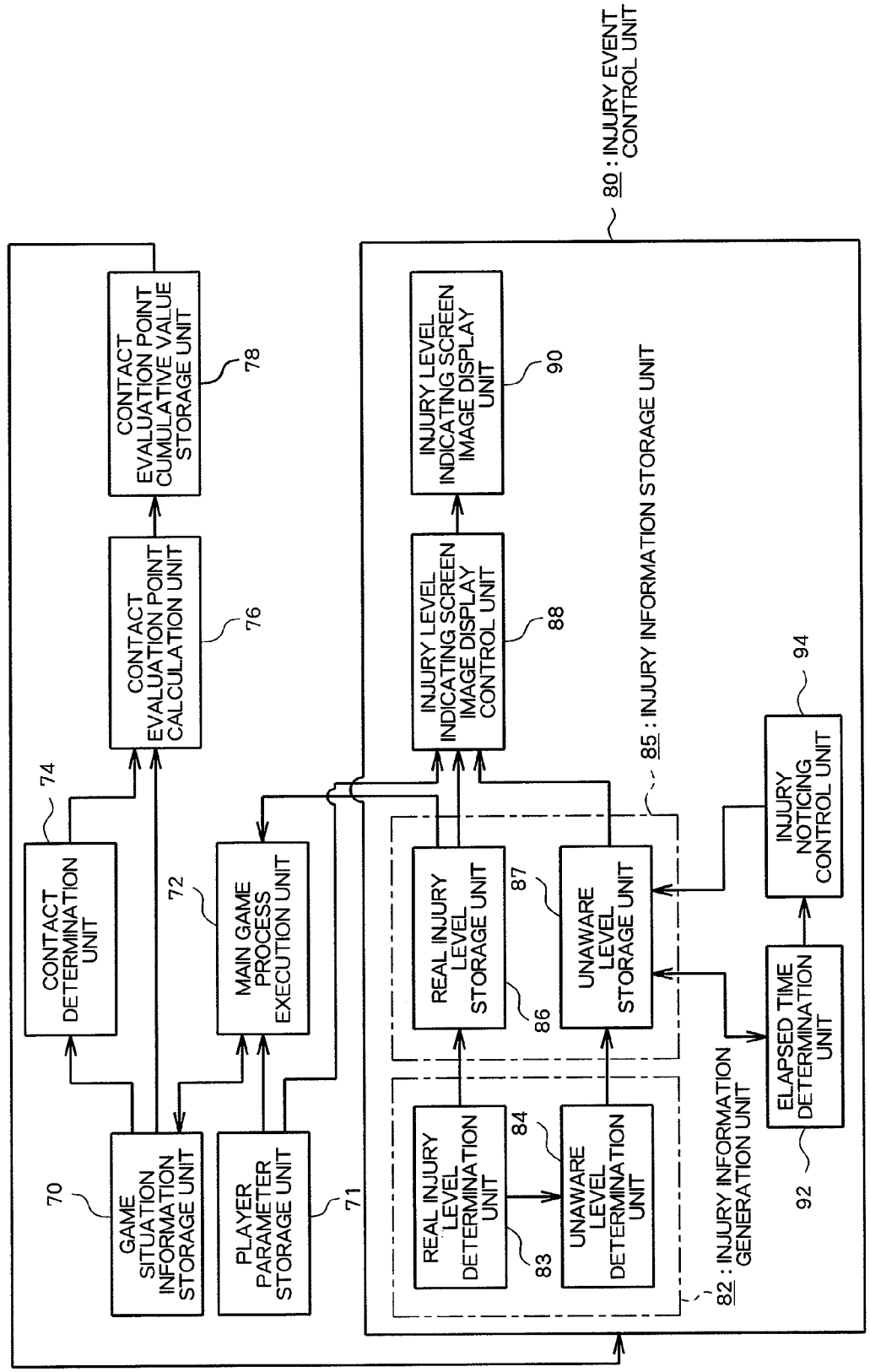
FIG. 4 is a functional block diagram of the game device according to the embodiment.

Here, a functional structure of the game device 10 will be described. FIG. 4 is a functional block diagram of the game device 10. As shown, the game device 10 comprises, in terms of functions, a game situation information storage unit 70, a player parameter storage unit 71, a main game process execution unit 72, a contact determination unit 74, a contact evaluation point calculation unit 76, a contact evaluation point cumulative value storage unit 78, and an injury event control unit 80. These functions are realized by the microprocessor 14 by executing a program read from the DVD-ROM 25.

[1. Game Situation Information Storage Unit]

The game situation information storage unit 70 is realized using the main memory 26 as a main component, and stores game situation information describing the situation of a game. The game situation information contains, for example, information about the position, orbit, moving speed, and moving direction of the ball object 64 and information about the position, posture, moving speed, and moving direction of each player object 58.

[2. Player Parameter Storage Unit]

The player parameter storage unit 71 is realized using the DVD-ROM 25 as a main element, and stores an ability parameter indicative of the various abilities of each player object 58.

The ability parameter includes, for example, a top speed parameter indicating a running speed, a pass accuracy parameter indicating accuracy in making a pass, a shoot accuracy parameter indicating accuracy in shooting, a tiredness parameter indicating an extent of tiredness, an injury tolerance parameter indicating tolerance for an injury, and so forth.

Figures 5, 6:
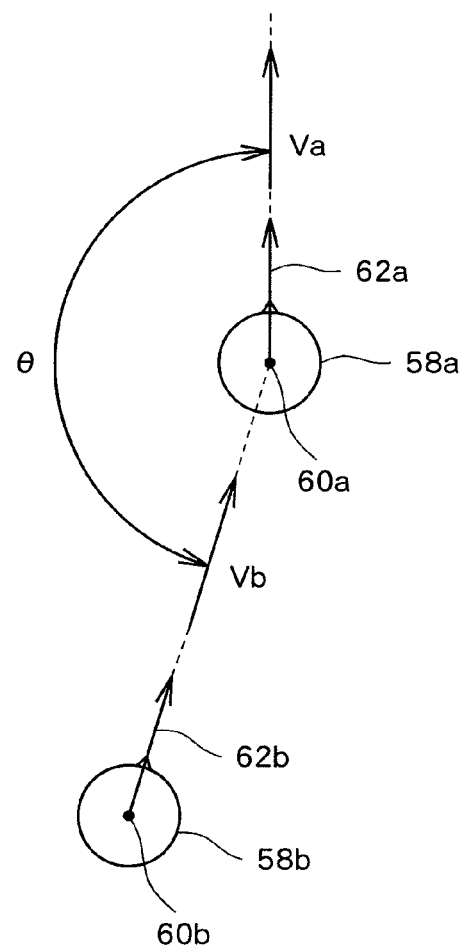
FIG. 5 is a diagram showing one example of a player table.
FIG. 6 is a diagram explaining a method for calculating a contact evaluation point.

The game situation information storage unit 70 and the player parameter storage unit 71 store a player table, such as is shown in FIG. 5, for example. As shown, the player object table has a "player ID" field, a "position information" field, a "posture information" field, a "moving speed information" field, and an "ability parameter" field. In the "player ID" field, information for uniquely identifying the player object 58 is stored. In the "position information" field, information about the current position of the player object 58 in the virtual three dimensional space 50 is stored, including, for example, the position coordinates of the representative point 60 of the player object 58. In the "posture information" field, information about the posture of the player object 58 in the virtual three dimensional space 50 is stored, including, for example, the kind and reproduction position of motion data being reproduced. In the "moving speed information" field, information about the moving direction and speed of the player object 58 is stored. In the "ability parameter" field, a parameter value indicating various abilities of the player object 58 is stored. It should be noted that the player table stores information about the position, name, and performance information (the number of goals and assists and so forth) of each player object 58, though not shown in FIG. 5, besides the above-mentioned information.

[3. Main Game Process Execution Unit]

The main game process execution unit 72 is realized using the microprocessor 14 as a main component. The main game process execution unit 72 carries out game processing based on the game situation information stored in the game situation information storage unit 70, the various parameter values stored in the player parameter storage unit 71, and an operation signal input from controller 32, and updates the game situation information stored in the game situation information storage unit 70. For example, the main game process execution unit 72 updates the position information of each player object 58, based on the moving speed information determined based on the top speed parameter value of the player object 58. For example, the position information of a player object 58 having a higher top speed parameter value is updated such that the player object 58 moves by a longer distance in a constant period of time.

The main game process execution unit 72 carries out the above-described game processing based further on the real injury level, stored in an real injury level storage unit 86 to be described later, and updates the game situation information stored in the game situation information storage unit 70, which will be described later.

[4. Contact Determination Unit]

The contact determination unit 74 is realized using the microprocessor 14 as a main component and determines whether or not each player object 58 (a contact evaluation target object) has contacted another player object 58 (a contacting candidate object). Whether or not the player object 58 contacts another player object 58 is determined based on whether or not a predetermined contact condition is satisfied, which is determined based on the positions of the player object 58 and the other player object 58.

[5. Contact Evaluation Point Calculation Unit]

The contact evaluation point calculation unit 76 is realized using the microprocessor 14 as a main component, and calculates, for a player object 58 determined by the contact determination unit as having contacted another player object 58, a contact evaluation point based on the condition of at least one of the player object 58 and the other player object 58 in the virtual three dimensional space 50.

Here, a method for calculating a contact evaluation point will be described. FIG. 6 is a diagram explaining a contact evaluation point calculation method, specifically, in a case in which the player object 58b moving at a moving speed vector Vb slides and tackles, and consequently contacts, the player object 58a moving at a moving speed vector Va.

Figures 7, 8, 9, 10:
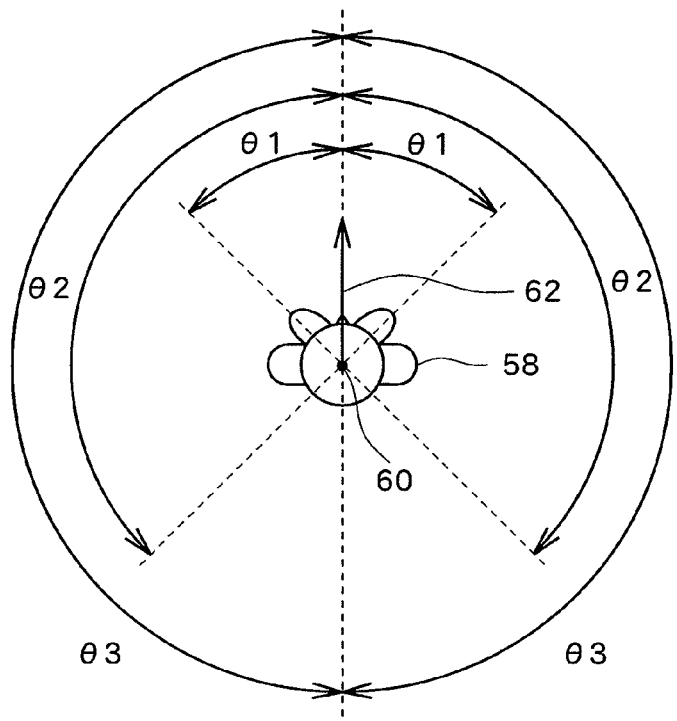
FIG. 7 is a diagram illustrating a method for calculating a contact evaluation point.
FIG. 8 is a diagram showing one example of a contact evaluation point table.
FIG. 9 is a diagram showing one example of a contact evaluation point table.
FIG. 10 is a diagram showing one example of a contact evaluation point cumulative value table.

In this case, the contact evaluation point calculation unit 76 obtains the position of at least one of the player object 58a and the player object 58b from the player table, and calculates based thereon a contact evaluation point of the player object 58a. In this embodiment, specifically, the contact evaluation point calculation unit 76 obtains the angle θ between the forward direction 62a of the player object 58a and the direction extending from the player object 58a toward the player object 58b, and calculates the contact evaluation point of the player object 58a based on the angle θ. Here, the contact evaluation point calculation unit 76 stores a contact evaluation point table (FIG. 8) which stores the contact evaluation point values in association with the respective angle ranges shown in FIG. 7, for example, in which E1, E2, E3 in FIG. 8 are determined so as to hold E1<E2<E3. That is, a contact evaluation point is determined such that a larger angle θ results in a higher contact evaluation point. Supposing that the angle θ satisfies θ2≦θ≦θ3, for example, the contact evaluation point calculation unit 76 obtains the contact evaluation point "E3", which corresponds to the range "θ2≦θ≦θ3", which contains the angle θ.

In addition, the contact evaluation point calculation unit 76 obtains the moving speed of at least one of the player object 58a and the player object 58b from the player table, and calculates based thereon a contact evaluation point of the player object 58a. In this embodiment, specifically, the contact evaluation point calculation unit 76 obtains the difference Δv between the moving speed of the player object 58b and that of the player object 58a, and calculates the contact evaluation point of the player object 58a based on the moving speed difference Δv. The difference Δv may be, for example, the difference between the absolute value of the moving speed vector Va and that of the moving speed vector Vb or alternatively the absolute value of the difference vector between the moving speed vector Vb and the moving speed vector Va. Here, the contact evaluation point calculation unit 76 stores a contact evaluation point table which stores the contact evaluation point values and the respective ranges of the difference Δv in a mutually associated manner (FIG. 9), in which E4, E5, E6 in FIG. 9 are determined so as to hold E4<E5<E6. That is, a contact evaluation point is determined such that a larger moving speed difference Δv results in a higher contact evaluation point. Supposing that the moving speed difference Δv satisfies V1≦Δv<V2, for example, the contact evaluation point calculation unit 76 obtains the contact evaluation point "E5", which corresponds to the range "V1≦Δv<V2", which contains the moving speed difference Δv.

Further, the contact evaluation point calculation unit 76 calculates a contact evaluation point of the player object 58a based on the manner in which at least one of the player object 58a and the player object 58b contacts the other (a contact action). In this embodiment, the contact evaluation point calculation unit 76 calculates the contact evaluation point of the player object 58a based on the manner in which the player object 58b contacts the player object 58a. Here, the contact evaluation point calculation unit 76 stores a contact evaluation point table which stores the manner of a contact action and a contact evaluation point value in a mutually associated manner. For example, with respect to the player object 58*b* slide tackling and thereby contacting the player object 58*a*, the contact evaluation point calculation unit 76 obtains the contact evaluation point corresponding to sliding tackle.

The contact evaluation point calculation unit 76 determines the sum of the contact evaluation point obtained as described above as the contact evaluation point of the player object 58*a* slide tackled by the player object 58*b*. That is, supposing that the contact evaluation point associated with the contact action "sliding tackle" is "E7", the contact evaluation point E of the player object 58*a* is determined as E3+E5+E7.

When a contact play such as is shown in FIG. 6 occurs, the contact evaluation point calculation unit 76 similarly calculates the contact evaluation point of the player object 58*b*.

[5. Contact Evaluation Point Cumulative Value Storage Unit]

The contact evaluation point cumulative value storage unit 78 is realized using the main memory 26 and/or the memory card 28 as a main component/components. The contact evaluation point cumulative value storage unit 78 stores the cumulative value of the contact evaluation points of the player object 58, calculated by the contact evaluation point calculation unit 76, so as to be associated with the player object 58. For example, the contact evaluation point cumulative value storage unit 78 stores a contact evaluation point cumulative value table such as is shown in FIG. 10.

[6. Injury Event Control Unit]

The injury event control unit 80 causes an injury event to occur with respect to a player object 58 at a probability based on the contact evaluation point cumulative value stored in the contact evaluation point cumulative value storage unit 78 so as to be associated with the player object 58, with details thereof to be described later (see S203 to S205 in FIG. 15).

The injury event control unit 80 comprises an injury information generation unit 82, an injury information storage unit 85, an injury level indicating screen image display control unit 88, an injury level indicating screen image display unit 90, an elapsed time determination unit 92, and an injury noticing control unit 94.

[6-1. Injury Information Storage Unit]

The injury information storage unit 85 is realized using the main memory 26 and/or the memory card 28 as a main component/components, and stores injury information about each player object 58. The injury information storage unit 85 comprises a real injury level storage unit 86 and an unaware level storage unit 87. The real injury level storage unit 86 stores a real injury level indicative of the presence/absence and seriousness of an injury so as to be associated with each player object 58, in which the real injury level is determined by a real injury level determination unit 83 to be described later. The unaware level storage unit 87 stores an unaware level indicative of the degree of unawareness of an injury so as to be associated with each player object 58, in which the unaware level is determined by an unaware level determination unit 84 to be described later.

Figures 11, 12:
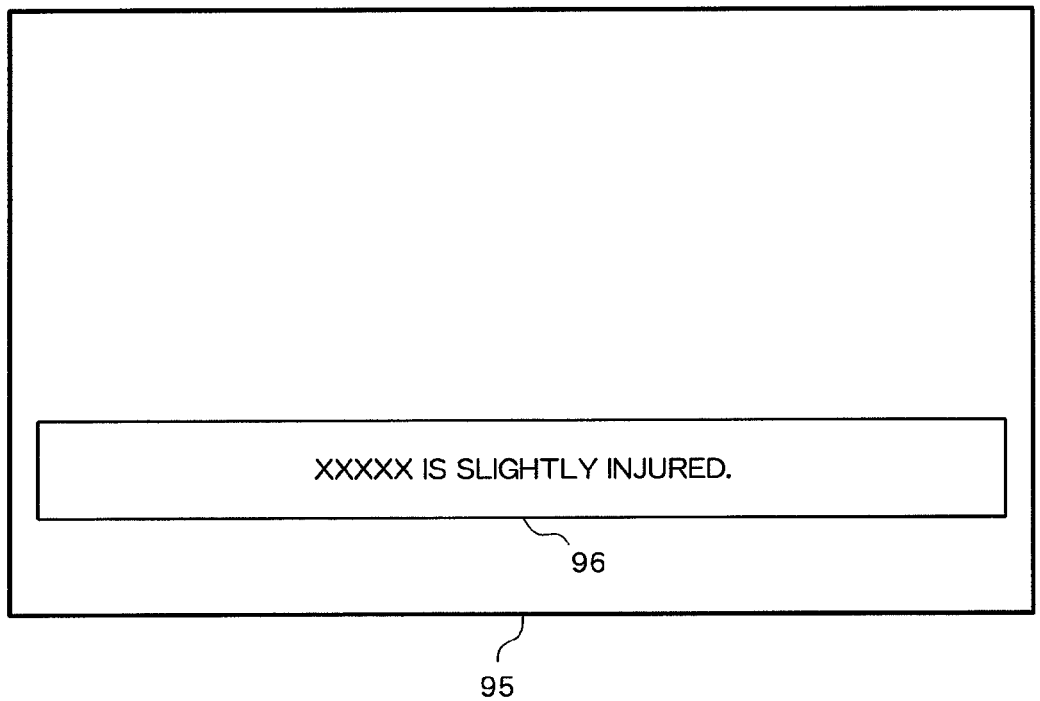
FIG. 11 is a diagram showing one example of an injury state table.
FIG. 12 is a diagram showing one example of an injury level indicating screen image.

The injury information storage unit 85 stores an injury state table, such as is shown in FIG. 11. As shown, the injury state table includes a "player ID" field, a "real injury level" field, an "unaware level" field, and an "elapsed time counter" field. In the "real injury level" field, a numeric value indicative of the presence/absence and seriousness of an injury is stored. In this embodiment, any of "1", "2", and "3" is stored, with "1" indicating a state free from an injury, "2" indicating a slightly injured state, and "3" indicating a seriously injured state. In the "unaware level" field, a numeric value indicative of the degree of unawareness of an injury is stored. In this embodiment, any of "0", "1", and "2" is stored in this embodiment, with "0" indicating accurate recognition of an injury state, "1" indicating rough recognition of an injury state, and "2" indicating a total absence of recognition of an injury state. In the "elapsed time counter" field, a numeric value indicative of the period of time elapsed after the player object 58 is injured (in other words, the period of time elapsed after an injury event occurs to the player object 58) is stored. In this embodiment, a numeric value indicative of an elapsed period of time expressed in units of 1/60 seconds is stored. The value obtained by subtracting the value in the "unaware level" field from the value in the "real injury level" field indicates the injury level which the player object 58 is aware of, and presented to the game player as the injury level of the player object 58 (see FIGS. 12 and 13). The value in the "elapsed time counter" field is updated by the elapsed time determination unit 92 to be described later (see S303 in FIG. 16).

[6-2. Injury Information Generation Unit]

The injury information generation unit 82 is realized using the microprocessor 14 as a main component, and generates injury information about a player object 58 involved in an injury event. The injury information generation unit 82 comprises a real injury level determination unit 83 and an unaware level determination unit 84.

[6-2-1. Real Injury Level Determination Unit]

The real injury level determination unit 83 determines the real injury level of a player object 58 involved in an injury event. In this embodiment, the real injury level determination unit 83 determines either "2" or "3" as an injury level based on a random number.

[6-2-2. Unaware Level Determination Unit]

The unaware level determination unit 84 determines the unaware level of a player object 58 involved in an injury event. In this embodiment, the unaware level determination unit 84 determines any of "0", "1", and "2" as an unaware level, based on the real injury level determined by the real injury level determination unit 83. For example, when the real injury level is determined as "2" by the real injury level determination unit 83, the unaware level determination unit 84 determines a value, namely, "0" or "1", smaller than the real injury level as the unaware level, based on a random number. Also, when the real injury level is determined as "3" by the real injury level determination unit 83, the unaware level determination unit 84 determines either one of "0", "1", and "2" as the unaware level, based on a random number.

The injury information generation unit 82 updates the content of the injury state table, based on the real injury level determined by the real injury level determination unit 83 and the unaware level determined by the unaware level determination unit 84.

The real injury level determined by the real injury level determination unit 83 and stored in the real injury level storage unit 86 is referred to by the main game process execution unit 72. That is, the main game process execution unit 72 carries out game processing based on the game situation information stored in the game situation information storage unit 70, the player ability parameter stored in the player parameter storage unit 71, and an operation signal input from controller 32, and further on the real injury level stored in the real injury level storage unit 86, and updates the game situation information stored in the game situation information storage unit 70.

For example, the main game process execution unit 72 determines the moving speed of the player object 58 so as to be restricted by an extent in accordance with the real injury level of the player object 58, stored in the real injury level storage unit 86. Specifically, the main game process execution unit 72 corrects the value of the top speed parameter of the player object 58 such that the ability of the player object 58 is deteriorated by an extent in accordance with the real injury level, and then determines the moving speed based on the corrected top speed parameter value. In this case, the main game process execution unit 72 updates the position of the player object 58, based on the moving speed calculated based on the corrected top speed parameter value.

It should be noted that the pass and shoot accuracy of the player object 58 is similarly restricted based on the real injury level of the player object 58. In this case, the main game process execution unit 72 updates the position, trajectory, and so forth of the ball object 64, based on the restricted pass and shoot accuracy.

[6-3. Elapsed Time Determination Unit]

The elapsed time determination unit 92 is realized using the microprocessor 14 as a main component. The elapsed time determination unit 92 determines, for a player object 58 having the unaware level "1" or "2", whether or not at least a predetermined period of time has passed after an injury event occurs to the player object 58, with details thereof to be described later (see S302 to S304 in FIG. 16). The elapsed time determination unit 92 may change the length of the predetermined period of time, based on any of the real injury level of the player object 58, the unaware level of the player object 58, and the difference between the real injury level and the unaware level of the player object 58.

[6-4. Injury Noticing Control Unit]

The injury noticing control unit 94 is realized using the microprocessor 14 as a main component. For a player object 58 for which it is determined that at least a predetermined period of time has elapsed after occurrence of an injury event, among those having the unaware level "1" or "2", the injury noticing control unit 94 determines whether or not to make the player object 58 aware of the real injury level, based on a random number. The injury noticing control unit 94 repeats this determination for every predetermined period of time, after the determination is made that at least a predetermined period of time has elapsed after occurrence of an injury event, and before a determination is made to make the player object 58 aware of the real injury level.

With the determination made to make the player object 58 aware of the real injury level, the injury noticing control unit 94 updates the unaware level of the player object 58 in the injury state table (see FIG. 11) to "0".

It should be noted that, when elapse of another predetermined period of time (for example, T2) after the elapse of at least a predetermined period of time (for example, T1) after occurrence of an injury event is determined, the injury noticing control unit 94 may determine to make the player object 58 aware of the real injury level without using a random number. With such a determination made, a screen image showing the contact play which causes the injury may be displayed together with a demonstration screen image indicating the real injury level. Here, suppose that the game device 10 is arranged so as to store replay data about a predetermined period of time from the current time back to a certain point in the past. With this arrangement, if a period of time elapsed after the occurrence of the contact play and before the determination made to make the player object 58 aware of the injury is too long, a replay screen may become no longer available for display. Regarding this point, the above-described arrangement can prevent a replay screen image becoming no longer available for replay.

When the elapse of at least a predetermined period of time after occurrence of an injury event is determined and an out-of-play state (a state in which the game is suspended by a referee or due to the ball having moved beyond a touch or goal line) follows, the injury noticing control unit 94 may determine to make the player object 58 aware of the real injury level without using a random number. Alternatively, the injury noticing control unit 94 may determine to make the player object 58 aware of the real injury level when the first or second half (match) ends even before elapse of at least a predetermined period of time after occurrence of an injury event is determined.

[6-5. Injury Level Indicating Screen Image Display Control Unit and Display Unit]

The injury level indicating screen image display control unit 88 is realized using the microprocessor 14 and the image processing unit 16 as main components. The injury level indicating screen image display unit 90 is realized using the monitor 18 as a main component. The injury level indicating screen image display control unit 88 produces an injury level indicating screen image based on the content stored in the injury information storage unit 85, and controls the injury level indicating screen image display unit 90 so as to display the produced screen image.

The injury level indicating screen image is a screen image indicating the injury level of a player object 58, including an injury message screen image telling that the player is injured, a player list presenting the conditions of all players of the team, and so forth. The injury level indicating screen image presents the injury level (hereinafter referred to as a noticed injury level) obtained by subtracting the "unaware level" from the "real injury level" of the player object 58, as the injury level of the player object 58.

For example, when an injury event occurs to any player object 58, that is, when the real injury level determination unit 83 and the unaware level determination unit 84 determine a real injury level and an unaware level, respectively, the injury level indicating screen image display control unit 88 controls the injury level indicating screen image display unit 90 so as to display an injury message screen image. Supposing that the real injury level of the player object 58 involved in an injury event is "3" and the unaware level thereof is "1", an injury message screen image 95 including a message image 96 telling that the player object 58 is slightly injured (the noticed injury level "2"), as shown in FIG. 12, is shown. When the noticed injury level of the player object 58 involved in an injury event is "1", the injury message screen image 95 is not shown.

When the injury noticing control unit 94 determines to make the player object 58 aware of the real injury level, and the unaware level of the player object 58 in the injury state table (see FIG. 11) is thus updated to "0", for example, the injury level indicating screen image display control unit 88 controls the injury level indicating screen image display unit 90 so as to display an injury message screen image similar to the injury message screen image shown in FIG. 12. In this case, for a player object 58 having a real injury level of "3" and an unaware level of "1" at the time of occurrence of an injury, an injury message screen image 95 telling that the player object 58 is seriously injured is displayed in response to the unaware level being updated to "0".

Figures 13, 14:
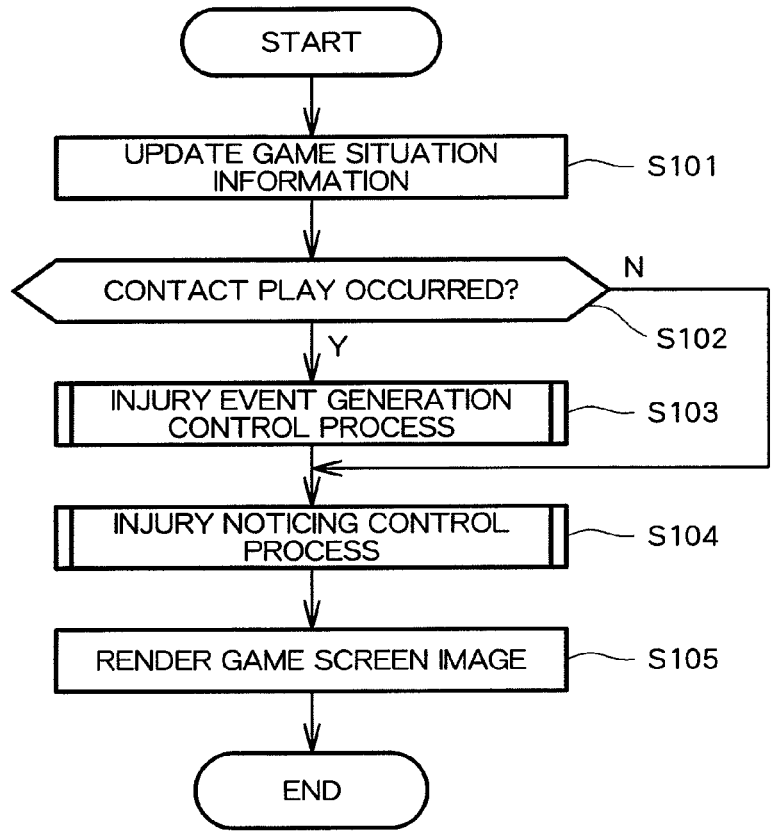
FIG. 13 is a diagram showing one example of an injury level indicating screen image.
FIG. 14 is a flowchart of a process carried out by the game device.

The injury level indicating screen image display control unit 88 controls the injury level indicating screen image display unit 90 so as to display the player list screen 97, such as is shown in FIG. 13, in response to a predetermined operation carried out by the game player during the game match. It should be noted that the player having the squad number "1" in FIG. 13 corresponds to the player object having the player ID "P1" in the player table (see FIG. 5). That is, the player having the squad number "n" corresponds to the player object having the player ID "Pn" in the player table (see FIG. 5).

As shown in FIG. 13, the player list screen 97 shows injury level indicating images 98a, 98b each indicative of the state of injury of each player in association with the player, with an injury level indicating image 98a of a black circle indicating a player seriously injured and an injury level indicating image 98b of a white circle indicating a player slightly injured. For example, for the player having the squad number "1", having a real injury level of "3" and the unaware level of "0" (see FIG. 5), the injury level indicating image 98a indicative of the injury level "3" is shown. For the player having the squad number "2", with the real injury level "3" and the unaware level "1" (see FIG. 5), the injury level indicating image 98b indicative of the injury level "2" is shown. That is, the player having the squad number "2" is presented as slightly injured though they are actually seriously injured. Similarly, the player having the squad number "3" is presented as not injured at all due to their unaware level being "2", though their real injury level is actually "3" (see FIG. 5).

In the following, a process to be carried out in the game device 10 for every predetermined period of time (1/60 seconds in this embodiment) will be described. FIG. 14 is a flowchart of a process according to the present invention among those to be carried out for every predetermined period of time in the game device 10. The shown process is realized by the microprocessor 14 by carrying out a program stored in the DVD-ROM 25.

As shown in FIG. 14, in this process, the main game process execution unit 72 updates the game situation information stored in the game situation information storage unit 70 (S101). Then, the contact determination unit 74 determines whether or not a contact play occurs (S102). The determination is carried out by carrying out a publicly known clash determination process based on the position information about each player object 58. When it is determined that a contact play occurs, an injury event generation control process is carried out relative to the player object 58 involved in the contact play (S103). The injury event generation control process is carried out relative to each of the player objects 58 involved in the contact play.

Figure 15:
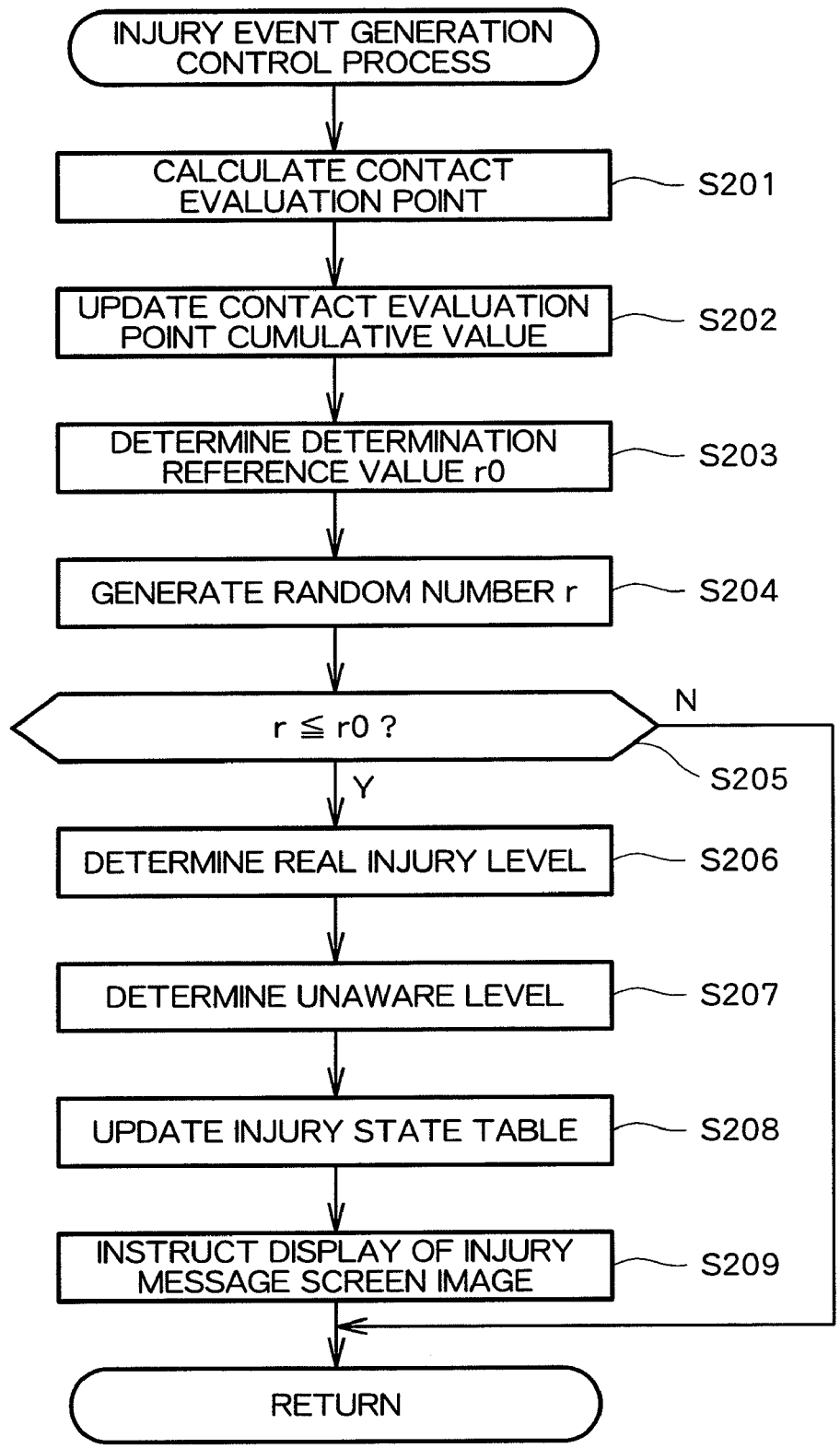
FIG. 15 is a flowchart of a process carried out by the game device.

FIG. 15 is a flowchart of the injury event generation control process. As shown, in this process, the contact evaluation point calculation unit 76 initially calculates the contact evaluation point of the target player object 58 (S201), then adds the contact evaluation point calculated at S201 to the contact evaluation point cumulative value stored in the contact evaluation point cumulative value table (see FIG. 10) so as to be associated with the target player object 58 (S202).

Thereafter, the injury event control unit 80 determines the determination reference value r0 (S203), then generates a random number r (S204), and determines whether or not the random number r is equal to or smaller than the determination reference value r0 (S205). When it is determined that the random number r is equal to or smaller than the determination reference value r0, the injury event control unit 80 controls to carry out a process to cause an injury event involving the target object player object 58 to occur (S206 to S208).

In S203, the determination reference value r0 is determined based on the contact evaluation point cumulative value of the target player object 58, stored in the contact evaluation point cumulative value table (see FIG. 10). In this embodiment, a determination reference value r0 is determined such that a larger cumulative value results in a larger determination reference value r0. Therefore, a player object 58 having a higher contact evaluation point cumulative value resultantly has a relatively large determination reference value r0, which results in a higher probability with which the random number r is determined as equal to or smaller than determination reference value r0 in S205. This means a higher probability of occurrence of an injury event. On the other hand, a player object 58 having a lower contact evaluation point cumulative value resultantly has a relatively small reference value r0, which results in a lower probability with which the random number r is determined equal to or smaller than the determination reference value r0 in S205. This means a lower probability of occurrence of an injury event.

Alternatively, the determination reference value r0 may be determined based on the tiredness parameter and/or the injury tolerance parameter of the player object 58, stored in the player table (see FIG. 5). For example, a target player object 58 suffering more serious tiredness resultantly has a larger determination reference value r0, which results in a higher probability of occurrence of an injury event. Alternatively, higher tolerance for an injury may result in a smaller determination reference value r0 such that a player object 58 having higher tolerance for an injury resultantly has a lower probability of occurrence of an injury event.

When it is determined in S205 that the random number r is equal to or smaller than the determination reference value r0, the real injury level determination unit 83 determines the real injury level of the target player object 58 based on the random number (S206). Thereafter, the unaware level determination unit 84 determines the unaware level of the target player object 58 based on the random number (S207). When the real injury level is determined "2" in S206, the unaware level determination unit 84 determines either "0" or "1", based on the random number. When the real injury level is determined "3" in S206, the unaware level determination unit 84 determines either one of "0", "1", and "2", based on the random number.

Then, the injury information generation unit 82 updates the injury state table (S208). That is, the injury information generation unit 82 updates the content of the "real injury level" field of the record corresponding to the target player object 58 to the real injury level determined in S206. In addition, the content in the "unaware level" field is updated to the unaware level determined in S207. Further, the content of the "elapsed time counter" is initialized to "0".

The injury information generation unit 82 generates instruction data to instruct the injury level indicating screen image display control unit 88 to display an injury message screen image (see FIG. 12), and stores in the main memory 26 (S209). The instruction data contains the player ID of the target player object, for example. In the case where the real injury level determined in S206 differs by one from the unaware level determined in S207, that is, the noticed injury level is "1" ("not injured"), the injury information generation unit 82 generates no instruction data described above.

When the injury event generation control process relative to all player objects 58 involved in the contact play detected in S102 is completed, the injury noticing control process is carried out (S104).

Figure 16:
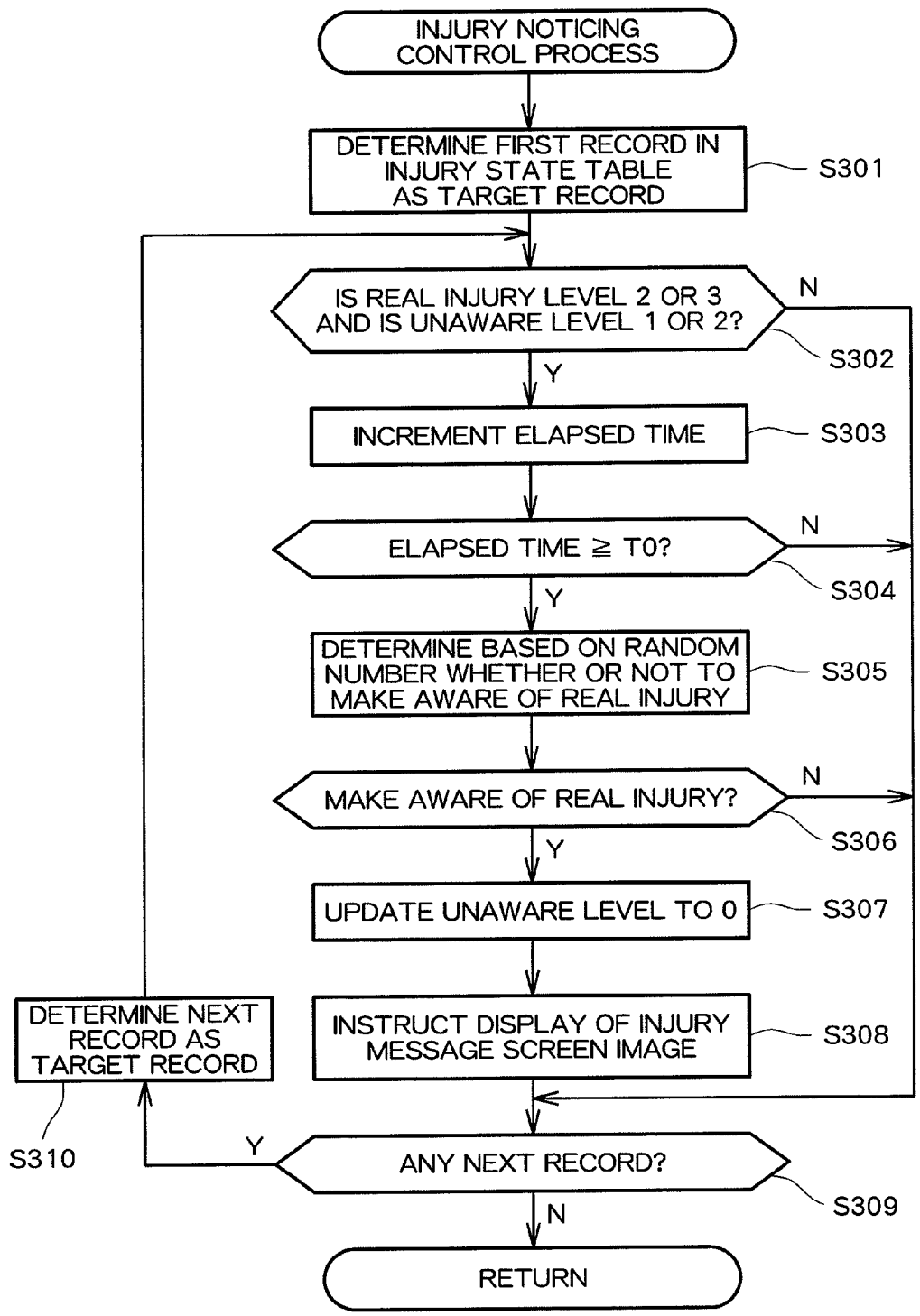
FIG. 16 is a flowchart of a process carried out by the game device.

FIG. 16 is a flowchart of the injury noticing control process. As shown, in this process, the first record in the injury state table is determined as an initial target record (S301), and whether or not the "real injury level" of the target record is "2" or "3" and the "unaware level" thereof is "1" or "2" is determined (S302).

When it is determined that the "real injury level" of the target record is "2" or "3" and the "unaware level" thereof is "1" or "2", the elapsed time determination unit 92 increments the numeric value stored in the "elapsed time counter" of the target record (S303). Then, the elapsed time determination unit 92 determines whether or not the numeric value stored in the "elapsed time counter" of the target record is equal to or larger than T0 (S304), in which T0 is numeric value information indicating the length of the time period in units of 1/60 seconds, which may be a predetermined constant or determined based on the difference between the "real injury level" and the "unaware level" of the target record.

When it is determined that the numeric value stored in the "elapsed time counter" of the target record is equal to or larger than T0, the injury noticing control unit 94 determines based on a random number whether or not to make the player object 58 corresponding to the target record aware of the real injury (S305). When it is determined to make the player object 58 corresponding to the target record aware of the real injury (Y in S306), the injury noticing control unit 94 updates the "unaware level" of the target record to "0" (S307).

In addition, the injury noticing control unit 94 generates instruction data to instruct the injury level indicating screen image display control unit 88 to display an injury message screen image (see FIG. 12), and stores in the main memory 26 (S308). The instruction data is data similar to the instruction data generated in S209.

Thereafter, whether or not there is a subsequent record in the injury state table is determined (S309). When it is determined that a subsequent record is present, that record is determined as a target record (S310), and the process in S302 to S308 is carried out.

With the process in S101 to S104 completed, a game screen image is rendered into the VRAM (S105). For example, an image obtained by viewing from a predetermined viewpoint "a virtual three dimensional space 50 where the respective player objects 58 and the ball object 64 are placed according to the game situation information stored in the game situation information storage unit 70" is generated, and a game screen image based on the image is formed in the VRAM.

With the instruction data generated in S209 or S308 and stored in the main memory 26, for example, the injury level indicating screen image display control unit 88 obtains the player ID contained in the instruction data, then obtains the real injury level and the unaware level, both corresponding to the player ID from the injury state table (see FIG. 11), and creates an injury message screen image (see FIG. 12) in the VRAM based on the obtained levels. In this case, the injury level indicating screen image display control unit 88 may obtain the value of the elapsed time counter, which corresponds to the player ID from the injury state table, then reads the replay data about the moment of occurrence of the contact play, based on the read value, and creates a replay screen image at that moment in the VRAM.

When the game player instructs to show a player list screen, for example, the injury level indicating screen image display control unit 88 may read the content of the injury state table (see FIG. 11), and creates a player list screen (see FIG. 13) in the VRAM, based on the content read.

As described above, the screen image formed in the VRAM is output at a predetermined timing to the monitor 18.

As described above, the game device 10 calculates a contact evaluation point for each player object 58 involved in a contact play when the contact play occurs between the player object 58 and another player object 58, and the contact evaluation point cumulative value of each player object 58 is stored. An injury event occurs to a player object 58 with the probability determined based on the contact evaluation point cumulative value of the player object 58. According to the game device 10, it is possible to display a picture, in a preferred mode, showing a player being injured as a result of involvement in multiple contact plays. This can enhance the excitement of an injury event and thus the appeal of the soccer game. Also, according to the game device 10, the above can be realized with relatively simple processing.

In the game device 10, the injury level and the unaware level are determined for an injured player object 58, and the ability (action) of the player object 58 is restricted depending on the value of the injury level. In this case, a noticed injury level, obtained by subtracting the unaware level from the real injury level, is presented. Therefore, the game player keeps playing the game while being aware of the noticed injury level as the injury level of the player object 58. However, the game player comes to feel suspicious about the player object 58 not playing with the full ability as expected, of which ability is actually restricted by the real injury level. After elapse of a predetermined period of time, the real injury level of the player object 58 is presented under a predetermined condition, so that the game player can realize the actual extent of the injury suffered by the player object 58. According to the game device 10, a picture in which the player object keeps playing without knowing the injury itself or the seriousness thereof and notices the injury or the seriousness thereof after a while can be produced in a preferred mode. This can resultantly diversify an injury event, whereby the excitement of an injury event and thus the soccer game is enhanced. Also, according to the game device 10, the above can be realized with relatively simple processing.

It should be noted that the present invention is not limited to the above-described embodiment.

For example, the present invention is applicable not only to a soccer game but also to various other sport games, including a baseball game, a basket ball game, an ice hockey game, and so forth. In this case, even when the player object contacts an object other than a player object, a contact evaluation point may be calculated and added to the contact evaluation point cumulative value. For example, in a baseball game, even when the player object contacts (clashes with) a ball object, a fence object, or the like, a contact evaluation point may be calculated and added to the contact evaluation point cumulative value. The present invention is applicable to a game other than a sport game.

It should be noted that, while the program is supplied from a DVD-ROM 25, or an information storage medium, to a consumer game device 11 in the above, the program may be supplied to a home and so forth by being transmitted via a network. FIG. 17 is a diagram showing a whole structure of a program distribution system using a communication network. A program distribution method according to the present invention will be described based on FIG. 17. As shown, the program distribution system 100 comprises a game database 102, a server 104, a communication network 106, a personal computer 108, a home-use game device 110, and a PDA (a portable data assistance) 112, with the game database 102 and the server 104 together constituting a program distribution device 114. The communication network 106 may comprise the Internet, a cable television network, and so forth. In this system, the game database (information storage medium) 102 stores a program similar to the content stored in the DVD-ROM 25. Consumers request distribution of the game using the personal computer 108, the consumer game device 110 or the PDA 112, or the like, whereby this request is conveyed to the server 104 via the communications network 106. Then, the server 104 responsive to the game distribution request reads a program from the game database 102, and sends to the entity having requested the game distribution, such as the personal computer 108, the consumer game device 110, the PDA 112, or the like. It should be noted that while the game distribution is carried out in response to a game distribution request in the above, the server 104 may send a game unidirectionally. Further, it is unnecessary to send all components of the program which are necessary to realize a game at once (collective distribution), and only a component of the program which is necessary according to an aspect of the game may be sent (dividing distribution). As described above, game distribution via the communication network 106 makes it possible for a demander wishing to obtain a program to readily obtain the program.

The invention claimed is:

1. A game device for carrying out game processing for every period of time to update positions of a contact evaluation target object and a contacting candidate object placed in a virtual dimensional space and to display an image showing a picture obtained by viewing the virtual three dimensional space from a viewpoint, comprising:
   means for determining whether a contact condition is satisfied, based on the positions of the contact evaluation target object and the contacting candidate object;
   means for storing information that associates an angle with a point value;
   means for calculating, when the means for determining determines that the contact condition is satisfied, a contact evaluation point of the contact evaluation target object based on a state of at least one of the contact evaluation target object and the contacting candidate object in the virtual three dimensional space, wherein said means for calculating obtains the point value associated with the angle, said angle being formed between a forward direction of the contact evaluation target object and a direction extending from a position of the contact evaluation target object to a position of the contacting candidate object, based on the information, and said means for calculating calculates the contact evaluation point, based on the point value obtained by the means for obtaining;
   means for storing a cumulative value of the contact evaluation point calculated by the contact evaluation point calculation means; and
   means for generating a game event in association with the contact evaluation target object with a probability based on the cumulative value of the contact evaluation point stored in the means for storing the cumulative value.

2. The game device according to claim 1, wherein the means for calculating calculates the contact evaluation point based on information about a difference between a moving speed of the contact evaluation target object and a moving speed of the contacting candidate object.

3. A control method for a game device for carrying out game processing for every period of time to update positions of a contact evaluation target object and a contacting candidate object placed in a virtual dimensional space and to display an image showing a picture obtained by viewing the virtual three dimensional space from a viewpoint, comprising:
   determining whether a contact condition is satisfied, based on the positions of the contact evaluation target object and the contacting candidate object;
   calculating, when it is determined at the determining that the contact condition is satisfied, a contact evaluation point of the contact evaluation target object based on a state of at least one of the contact evaluation target object and the contacting candidate object in the virtual three dimensional space;
   storing the cumulative value of the contact evaluation point calculated at the calculating in a storage device; and
   generating a game event in association with the contact evaluation target object with a probability based on the cumulative value of the contact evaluation point stored in the storage device,
   wherein the calculating includes obtaining a point value associated with an angle formed between a forward direction of the contact evaluation target object and a direction extending from a position of the contact evaluation target object to a position of the contacting candidate object, based on information stored in a storage device which stores the information that associates an angle with a point value, and calculating the contact evaluation point based on the point value obtained by the calculating.

4. A non-transitory computer readable information storage medium storing a program for causing a computer to perform as a game device or carrying out game processing for every period of time to update positions of a contact evaluation target object and a contacting candidate object placed in a virtual dimensional space and to display an image showing a picture obtained by viewing the virtual three dimensional space from a viewpoint, the program further causing the computer to function as:
   a determining unit for determining whether or not a contact condition is satisfied, based on the positions of the contact evaluation target object and the contacting candidate object;
   a calculating unit for calculating, when the determining unit determines that the contact condition is satisfied, a contact evaluation point of the contact evaluation target object based on a state of at least one of the contact evaluation target object and the contacting candidate object in the virtual three dimensional space;
   a storing unit for storing a cumulative value of the contact evaluation point calculated by the calculating unit; and
   a generating unit for generating a game event in association with the contact evaluation target object with a probability based on the cumulative value of the contact evaluation point stored in the storing unit,
   wherein the calculating unit obtains a point value associated with an angle formed between a forward direction of the contact evaluation target object and a direction extending from a position of the contact evaluation target object to a position of the contacting candidate object, based on information stored in the storing unit which stores the information that associates the angle with the point value, and calculates the contact evaluation point based on the obtained point value.

* * * * *